US009195501B2

(12) United States Patent
Arvo

(10) Patent No.: US 9,195,501 B2
(45) Date of Patent: Nov. 24, 2015

(54) INSTRUCTION CULLING IN GRAPHICS PROCESSING UNIT

(75) Inventor: Jukka-Pekka Arvo, Raisio (FI)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 13/181,233

(22) Filed: Jul. 12, 2011

(65) Prior Publication Data

US 2013/0016110 A1 Jan. 17, 2013

(51) Int. Cl.
*G06F 9/48* (2006.01)

(52) U.S. Cl.
CPC .................................... *G06F 9/4881* (2013.01)

(58) Field of Classification Search
CPC ......... G06T 1/20; G06T 15/005; G06F 15/76; G06F 9/30; G06F 9/3012; G06F 9/30123; G06F 9/3013; G06F 9/30032; G06F 9/30036; G06F 9/3001; G06F 9/50; G06F 9/3836; G06F 9/3851; G06F 9/3853; G06F 8/443; G06F 8/4441; G06F 8/4442; G06F 8/4443; G06F 9/461–9/468; G06F 9/4881
USPC .......................... 345/501, 522; 712/220–245, 712/E9.016–E9.073, E9.082–E9.083; 718/102
See application file for complete search history.

(56) References Cited

U.S. PATENT DOCUMENTS

| 6,742,111 | B2 * | 5/2004 | Soni .............................. | 712/217 |
| 7,015,913 | B1 * | 3/2006 | Lindholm et al. ............ | 345/501 |
| 7,324,113 | B1 | 1/2008 | Rouet et al. | |
| 7,528,843 | B1 * | 5/2009 | Kilgard et al. ................ | 345/582 |
| 2003/0009748 | A1 * | 1/2003 | Glanville et al. ............. | 717/140 |
| 2003/0028860 | A1 * | 2/2003 | Sumida et al. ................ | 717/125 |
| 2005/0068325 | A1 * | 3/2005 | Lefebvre et al. ............. | 345/522 |
| 2006/0005178 | A1 * | 1/2006 | Kilgard et al. ................ | 717/153 |
| 2006/0066623 | A1 | 3/2006 | Bowen | |
| 2006/0117316 | A1 * | 6/2006 | Cismas et al. ................ | 718/103 |
| 2006/0150161 | A1 * | 7/2006 | Onder ........................... | 717/127 |

(Continued)

FOREIGN PATENT DOCUMENTS

| EP | 0821302 A1 | 1/1998 |
| JP | 2007034723 A | 2/2007 |

(Continued)

OTHER PUBLICATIONS

NVIDIA, OpenCL Programming Guide for the CUDA Architecture, 2009, NVIDIA Corporation, Santa Clara, CA, pp. 1-61.*

(Continued)

*Primary Examiner* — Xiao Wu
*Assistant Examiner* — Michael J Cobb
(74) *Attorney, Agent, or Firm* — Shumaker & Sieffert, P.A.

(57) ABSTRACT

Aspects of the disclosure are directed to a method of processing data with a graphics processing unit (GPU). According to some aspects, the method includes executing a first work item with a shader processor of the GPU, wherein the first work item includes one or more instructions for processing input data. The method also includes generating one or more values based on a result of the first work item, wherein the one or more values represent one or more characteristics of the result. The method also includes determining whether to execute a second work item based on the one or more values, wherein the second work item includes one or more instructions that are distinct from the one or more instructions of the first work item for processing the input data.

25 Claims, 8 Drawing Sheets

(56) References Cited

U.S. PATENT DOCUMENTS

| | | | |
|---|---|---|---|
| 2007/0180438 A1* | 8/2007 | Suba | 717/151 |
| 2008/0074433 A1* | 3/2008 | Jiao et al. | 345/522 |
| 2008/0084424 A1* | 4/2008 | Hsu | 345/522 |
| 2009/0070772 A1* | 3/2009 | Shikano | 718/106 |
| 2009/0125893 A1* | 5/2009 | Copeland et al. | 717/151 |
| 2009/0251475 A1 | 10/2009 | Mathur et al. | |
| 2011/0055838 A1* | 3/2011 | Moyes | 718/102 |
| 2011/0063311 A1 | 3/2011 | McCrary et al. | |
| 2011/0078415 A1* | 3/2011 | Johnson et al. | 712/208 |
| 2011/0115802 A1* | 5/2011 | Mantor et al. | 345/520 |
| 2012/0066455 A1* | 3/2012 | Punyamurtula et al. | 711/122 |
| 2012/0291040 A1* | 11/2012 | Breternitz et al. | 718/104 |
| 2012/0297163 A1* | 11/2012 | Breternitz et al. | 712/22 |
| 2012/0306877 A1* | 12/2012 | Rosasco | 345/426 |
| 2012/0331278 A1* | 12/2012 | Breternitz et al. | 712/236 |
| 2013/0086598 A1* | 4/2013 | Gschwind et al. | 719/330 |
| 2013/0205123 A1* | 8/2013 | Vorbach | 712/221 |
| 2013/0318507 A1* | 11/2013 | Breternitz et al. | 717/129 |
| 2014/0375658 A1* | 12/2014 | Lichmanov et al. | 345/520 |

FOREIGN PATENT DOCUMENTS

| | | |
|---|---|---|
| JP | 2009021964 A | 1/2009 |
| JP | 2010020755 A | 1/2010 |
| WO | 2009132013 A1 | 10/2009 |
| WO | 2011017026 A1 | 2/2011 |

OTHER PUBLICATIONS

Dana Schaa, Byunghyun Jang, Programming with CUDA and OpenCL, 2010, Northeastern University, pp. 1-33.*

Cliff Woolley, Introduction to OpenCL, Apr. 2011, NVIDIA Corporation, Santa Clara, CA, pp. 1-57.*

Aaftab Munshi, The OpenCL Specification, 2009, Khronos OpenCL Working Group, Version 1.0, Revision 48.*

Fahimeh Yazdanpanah, Carlos Alvarez-Martinez, Daniel Jimenez-Gonzalez, Yoav Etsion, Hybrid Dataflow/von-Neumann Architectures, 2014, IEEE Transactions on Parallel and Distributed Systems, 26(6):1489-1509.*

Hideki Sunahara, Mario Tokoro, Half-Dynamic Scheduling with Data-flow Control, 1988, Supercomputing Lecture Notes in Computer Science vol. 297:552-562.*

Anjul Patney, John D. Owens, Real-Time Reyes-Style Adaptive Surface Subdivision, 2008, ACM Transactions on Graphics, 27(5):143:1-8.*

Borgo et al., "State of the Art Report on GPU Visualization," Visualization & Virtual Reality Research Group, University of Leeds School of Computing, Jan. 5, 2009, 36 pp.

International Preliminary Report on Patentability—PCT/US2011/064600, The International Bureau of WIPO—Geneva, Switzerland, Sep. 13, 2013 (6 pages).

Second Written Opinion—PCT/US2011/064600, European Patent Office, Jun. 17, 2013 (5 pages).

International Search Report and Written Opinion of international application No. PCT/US2011/064600, dated Apr. 3, 2012, 10 pp.

Ando, "Technology to Support Processors World of Endless Desire for Speed: 1st Edition," Gijyutsu-Hyohron Co., Ltd., Jan. 25, 2011, 1st Edition, pp. 311-343 (partial translation included).

Office Action, and translation thereof, from counterpart Japanese Application Serial No. 2014-520175 mailed Feb. 10, 2015, 6 pp.

Notice of Grounds for Rejection from corresponding Korea Application No. 2014-7003584 dated Apr. 30, 2015 (10 pages).

* cited by examiner

INSTRUCTION CULLING IN GRAPHICS PROCESSING UNIT

TECHNICAL FIELD

Aspects of the disclosure relate to processing data with a graphics processing unit (GPU).

BACKGROUND

Graphics processing devices may be implemented to carry out a variety of image processing or other general purpose processing applications. For example, a graphics processing unit (GPU), sometimes referred to as a general purpose graphics processing unit (GPGPU), may execute applications that benefit from a high degree of parallelism, such as color correction algorithms, face detection algorithms, pattern recognition algorithms, augmented reality applications, a variety of algorithm applications (e.g., wavelet transforms, Fourier transforms, and the like), or a variety of other applications.

In general, GPUs are designed to process a series of instructions, which may be referred to as shader instructions, using one or more shader processors residing in the GPU. In an example image processing application, shader instructions may define one or more mathematical operations to be performed by the shader processors on the pixels that make up the image. By applying a shader instruction to a pixel, the pixel value is changed or evaluated according to the mathematical operation defined by the shader instruction.

Shader instructions may be organized into shader program code known as a kernel. A kernel may define a function or task that is performed by the GPU. In order to execute a kernel, the program code is divided into work items (e.g., a basic unit of work in a GPU), which are organized into one or more workgroups (e.g., a set of work items).

SUMMARY

In general, aspects of the disclosure relate to identifying irrelevant shader instructions for execution by a GPU, and preventing the irrelevant instructions from being executed. To prevent irrelevant instructions from being executed, irrelevant instructions may be "culled," or removed, from a set of instructions before they are executed. According to some aspects, a GPU may implement a cull buffer to carry out instruction culling. For example, after executing an instruction, a GPU may store one or more values that represent one or more characteristics (e.g., such as a relevance characteristic) of a subsequent instruction. The GPU can use the stored values to determine whether to remove the subsequent instruction before the instruction is executed.

In one example, aspects of the disclosure are directed to a method of processing data with a graphics processing unit (GPU). According to some aspects, the method includes executing a first work item with a shader processor of the GPU, wherein the first work item includes one or more instructions for processing input data. The method also includes generating one or more values based on a result of the first work item, wherein the one or more values represent one or more characteristics of the result. The method also includes determining whether to execute a second work item based on the one or more values, wherein the second work item includes one or more instructions that are distinct from the one or more instructions of the first work item for processing the input data.

In another example, aspects of the disclosure are directed to an apparatus for processing data with a graphics processing unit (GPU). The apparatus includes a shader processor configured to execute a first work item that includes one or more instructions for processing input data, and to generate one or more values based on a result of the first instruction, wherein the one or more values represent one or more characteristics of the result. The apparatus also includes a cull module configured to determine whether to execute a second work item that includes one or more instructions that are distinct from the one or more instructions of the first work item based on the one or more values.

In another example, aspects of the disclosure are directed to a computer-readable storage medium encoded with instructions for causing one or more programmable processors of a computing device to execute a first work item, wherein the first work item includes one or more instructions for processing input data, and to generate one or more values based on a result of the first work item, wherein the one or more values represent one or more characteristics of the result. The computer-readable storage medium is also encoded with instructions for causing the one or more programmable processors of the computing device to determine whether to execute a second work item based on the one or more values, wherein the second work item includes one or more instructions that are distinct from the first work item for processing the input data.

In another example, aspects of the disclosure are directed to an apparatus for processing data with a graphics processing unit (GPU). The apparatus includes a means for executing a first work item, wherein the first work item includes one or more instructions for processing input data. The apparatus also includes a means for generating one or more values based on a result of the first work item, wherein the one or more values represent one or more characteristics of the result. The apparatus also includes a means for determining whether to execute a second work item based on the one or more values, wherein the second work item includes one or more instructions that are distinct from the first work item for processing the input data.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
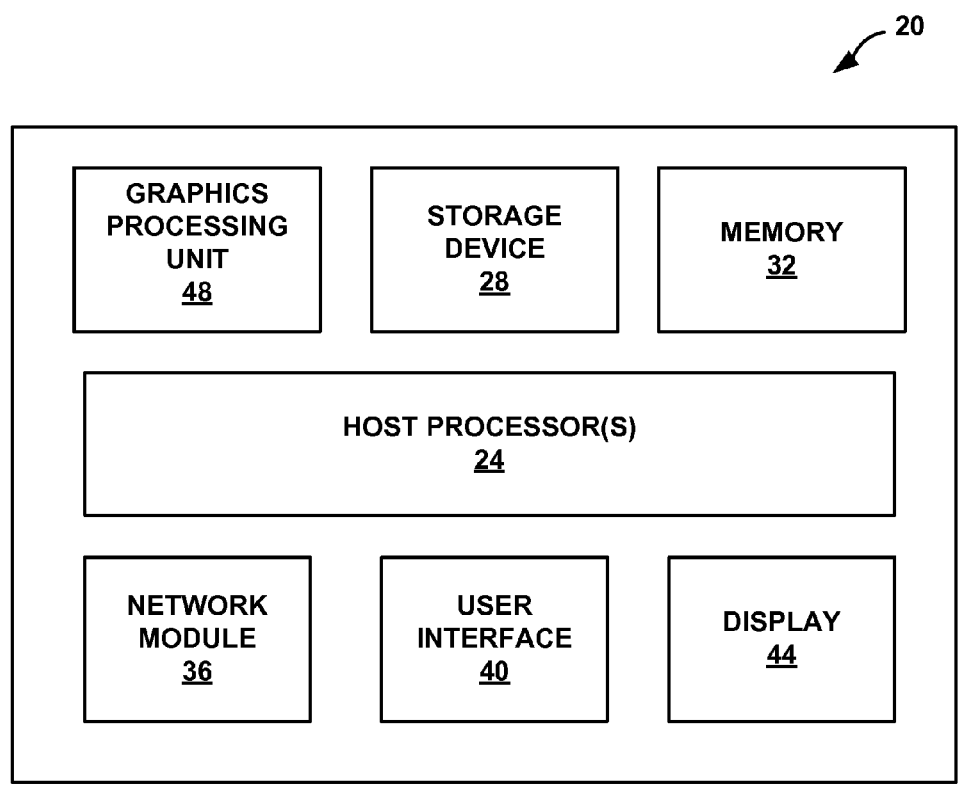
FIG. 1 is a block diagram illustrating a computing device that may implement techniques for identifying and culling irrelevant instructions according to aspects of the disclosure.

Aspects of this disclosure generally relate to increasing efficiency of a graphics processing unit ("GPU"), which may be implemented as a general purpose graphics processing unit ("GPGPU"). In general, a GPU includes a plurality of shader processors ("SPs") for performing calculations. The calculations may be structured in a GPGPU application that includes one or more shader programs (referred to herein as "kernels"). Kernels define functions that can be implemented to analyze or modify a variety of input data. Examples include functions for processing relatively large numerical data sets in parallel. In an image processing context, functions may include, for example, color correction algorithms, face detection algorithms, or functions for carrying out augmented reality applications. Other examples include transform functions, functions for ray tracing, or a variety of other functions.

Kernels are comprised of individual work items (e.g., a basic unit of work in a GPU) that may be grouped into workgroups. In an example in which a GPU is implemented to process an image (e.g., a frame of video data, a computer-generated graphics image, a still image, and the like), work items may include one or more instructions that define a function for analyzing or modifying pixels of the image. In addition, a plurality of work items can be organized into workgroups (e.g., a set of work items) for analyzing or modifying a group of pixels of the image.

Some applications may include multiple kernels for carrying out multiple functions on the same input data. Further, applications having multiple kernels may include some kernels that are dependent on other kernels. For example, an application may include two kernels, with a second kernel that is dependent on the results of the first kernel. Accordingly, in some examples, the results of a kernel may make the results of a subsequent kernel "irrelevant." As described herein, an "irrelevant instruction" may be an instruction that does not advance the purpose of the application. Stated differently, an "irrelevant" instruction may be an instruction that does not change, or does not factor into, the outcome of the application.

In a simple example, an application includes two kernels for identifying a feature in dataset [x, y, z]. The first kernel and the second kernel each have three instructions, which may be defined in three distinct work items, associated with [x, y, z], respectively. The three instructions evaluate to "true" if the feature is identified by executing the instruction or "false" if the feature is not identified by executing the instruction. In addition, the second kernel is dependent on the results of the first kernel. For example, the instructions of both kernels must evaluate to "true" to identify the feature, so the instructions of the second kernel are dependent on the instructions of the first kernel evaluating to "true." After executing the first kernel, the GPU determines that the desired feature may be included in "x" and "y," but not in "z." The instruction of the second kernel related to "z," then, is irrelevant to the result of the application. For example, the second instruction related to "z" does not factor into the outcome of the application, because even if the second instruction related to "z" evaluates to "true," the instruction has already failed the first kernel. In particular, the instruction related to "z" in the first kernel did not identify the desired feature. In this example application, the second kernel includes an individual irrelevant instruction (e.g., a work item), such that only a portion of the kernel is irrelevant and the remainder of the kernel may be relevant to the result.

A kernel having more than one irrelevant instruction may be described, in some circumstances, as being "sparse." For example, a "sparse" kernel may include relevant instructions that are separated by many irrelevant instructions. Typically, a GPU distributes all instructions (e.g., work items and workgroups of kernels) to shader processors (SPs) for execution, regardless of the relevance of the instruction. For example, a GPU generally does not include a mechanism for identifying irrelevant instructions. Accordingly, the SPs of the GPU typically must execute all workgroups and work items of a kernel, regardless of the relevance of the workgroup or work item. Executing sparse kernels may detract from GPU performance, because SPs of the GPU are occupied executing irrelevant instructions, consuming GPU processing power.

Aspects of the disclosure relate to increasing efficiency and utilization of SPs of a GPU by avoiding execution of at least some irrelevant instructions. In some examples, a GPU identifies irrelevant instructions and prevents the irrelevant instructions from being processed by SPs of the GPU. That is, the GPU may identify irrelevant work items, which are a basic unit of work (e.g., executable code) in the GPU an may include one or more individual instructions, and may prevent the irrelevant work items from being processed by SPs of the GPU. To prevent the irrelevant work items from being processed, GPU may "cull," or remove, the irrelevant work items before they are executed. According to some aspects, a GPU may implement a cull buffer to carry out culling. For example, the cull buffer may hold one or more values that the GPU can use to determine whether to remove a work item before the work item can be executed.

In general the terms "work item" and "instruction" may be used interchangeably. This disclosure generally describes an instruction as at least a portion of a function for processing input data. This disclosure generally refers to a work item as a basic unit of work (e.g., a basic unit of executable code) for a GPU, which may include one or more individual instructions. Thus, it should be understood that the term "work item" refers generically to one or more instructions that define a function for processing input data. A "work item" may also be referred to in Compute Unified Device Architecture ("CUDA" developed by NVIDIA Corporation, version 3.2 released Sep. 17, 2010) as a "thread."

A GPU may cull irrelevant instructions from a set of instructions prior to organizing and distributing the instructions to SPs for execution. Culling irrelevant instructions before they can be distributed to, and processed by the SPs, may help to increase efficiency of the GPU, because SPs are not occupied executing irrelevant instructions. In addition, with culling of irrelevant instructions, the GPU does not devote resources to organizing and distributing irrelevant instructions. Rather, the GPU is able to distribute relevant instructions to the SPs, which are able to continuously execute instructions that are relevant.

According to aspects of the disclosure, a GPU may implement a cull buffer to carry out instruction culling. The cull buffer may store one or more values that represent a characteristic of an executed instruction. The characteristic can be used to determine whether a subsequent instruction is relevant or irrelevant. For example, a GPU may execute an application having two kernels. While executing the first kernel, the GPU may store one or more values to the cull buffer that represent whether, based on the results of the instructions associated with the first kernel, the instructions of the second kernel are relevant. If one or more instructions of the second kernel are not relevant, the GPU may prevent the irrelevant instructions from being executed by the SPs. For example, a component of the GPU responsible for organizing and distributing instructions to the SPs may cull the irrelevant instructions based on the values stored in the cull buffer.

Thus, in general, techniques of this disclosure include executing an application for processing input data using more than one kernel. Upon executing work items and workgroups of a first kernel, the GPU may set cull buffer values that represent whether the work items and workgroups of a second kernel are relevant. That is, the GPU may set cull buffer values based on the results of the first kernel, which represent whether respective work items and workgroups of a second kernel that are associated with the same input data of each of the work items and workgroups of the first kernel are relevant. Thus, after executing the first kernel, the GPU may utilize the cull buffer values to cull irrelevant work items and workgroups in the second kernel so that the irrelevant work items and workgroups are not executed.

In some examples, the cull buffer may be designed to store one or more values that represent a characteristic of every instruction of an application. For example, after executing each instruction, the GPU may store a cull buffer that represents a characteristic of each instruction indicating whether the instruction is relevant or irrelevant. In another example, the GPU may store a cull buffer value only when GPU determines that the subsequent instruction is irrelevant.

The cull buffer may be designed to store one or more values that represent a characteristic of a workgroup, as well as one or more values that represent a characteristic of individual work items within the work group. Accordingly, the cull buffer can be used to determine whether instructions are irrelevant on both a workgroup and a work item level. If all of the work items of a given workgroup are rendered irrelevant by a previously executed kernel, the GPU can cull the entire workgroup, so that the irrelevant workgroup is not executed by the SPs. Alternatively, if only some of the work items of a given workgroup are rendered irrelevant by a previously executed kernel, the GPU can cull individual work items, so that the irrelevant work items are not executed by the SPs.

It should be understood that the term "workgroup" refers generically to a predefined group of instructions, such as a predefined group of work items. A "workgroup" may also be referred to in Compute Unified Device Architecture ("CUDA" developed by NVIDIA Corporation, version 3.2 released Sep. 17, 2010) as a "thread block."

Aspects of the disclosure include the use of a variety of different cull buffer sizes and a variety of different cull buffer capabilities. In one example, a cull buffer may store a single binary value (e.g., a single bit of storage) that represents a single characteristic of each work item of a kernel. In such an example, the GPU may use the cull buffer value to identify whether a work item is relevant or irrelevant based on the result of a previously executed work item.

A cull buffer that stores a single binary value is merely one example of a cull buffer configuration. In another example, a cull buffer may store more than one value per work item. For example, the cull buffer may store more than one value that corresponds to more than one characteristic of an executed work item. In a non-limiting image processing example, a GPU may execute a work item on pixel data to determine Red Green Blue (RGB) characteristics of the pixel data. Accordingly, a cull buffer may be implemented to store three values corresponding to the red, green, and blue components of the executed instruction. In this example, the GPU may cull instructions based on any of the values stored in the cull buffer. It should be understood that the configuration (e.g., size and capability) of the cull buffer is application and GPU dependent. For example, some GPUs may be designed to provide a relatively large amount of memory for a relatively large and multifunctional cull buffer. Other GPUs may not be capable of providing such versatility. Accordingly, it should be understood that the examples provided are not the only configurations of cull buffers that may be implemented.

A GPU may store values to a cull buffer in a variety of ways. In one example, after an SP executes a work item, the SP may write one or more cull buffer values to a cull buffer based on the result of the executed work item. In this example, after executing a new work item of another kernel (e.g., a work item associated with the same input data) the SP may update the one or more cull buffer values by reading the one or more cull buffer values stored in the cull buffer and comparing the one or more cull buffer values to the new value generated by execution of the new work item. In this example, there may be some latency associated with reading the one or more cull buffer values stored in the cull buffer prior to comparing the stored values to the new value generated by execution of the new work item.

In another example, after an SP executes a work item, an SP may provide one or more cull buffer values to programmable or fixed function hardware, which writes the one or more cull buffer values to the cull buffer. For example, the programmable or fixed function hardware may be configured to receive an input from the SP upon execution of the work item. The programmable or fixed function hardware can then be implemented to interpret the input and store one or more values to the cull buffer that corresponds to the input. In this example, the programmable or fixed function hardware may be responsible for comparing the one or more values stored in the cull buffer to the new value generated by execution of a new work item. Allowing programmable or fixed function hardware to perform the cull buffer update may result in lower latency, because the SP does not need to read the stored one or more cull buffer values. Rather, the programmable or fixed function hardware would be responsible for reading the one or more cull buffer values.

According to some aspects, the buffer values may be accessed and utilized by a component of the GPU responsible for sequencing and distributing instructions to SPs of the GPU. For example, the sequencing component may read the buffer values and remove the instructions while preparing the instructions for distribution to the SPs. Accordingly, the sequencing component can remove the instructions before distributing the instructions to the SPs. In some examples, the sequencing component may be responsible for both workgroup and work item setup and distribution. The sequencing component may read the values stored in the cull buffer and remove instructions on both a workgroup and work item level before distributing the instructions to the SP. For example, the sequencing module may read the values stored in the cull buffer and determine that an entire workgroup of work items is irrelevant based on the values. The sequencing module may also read the values stored in the cull buffer and determine that individual work items are irrelevant based on the values.

According to some aspects, an application may include instructions that enable instruction culling. For example, the application may include instructions that enable a cull buffer to function. To enable instruction culling, executed instructions of an application provide both a result, as well as one or more values to be stored in a cull buffer that represent a characteristic of the result, which can be used to determine the relevance of a subsequent instruction.

GPU application programming is typically performed by a user (e.g., a computer programmer) with an application program interface (API) that provides a standard software interface that can run on multiple platforms, operating systems, and hardware. Examples of APIs include Open Graphics Library ("OpenGL," version 4.1 released Jul. 26, 2010 and publically available), Compute Unified Device Architecture ("CUDA" developed by NVIDA Corporation, version 3.2 released Sep. 17, 2010), and DirectX (developed by Microsoft, version 11 released Oct. 27, 2009). In general, an API includes a predetermined, standardized set of commands that are executed by associated hardware. API commands allow a user to instruct hardware components of a GPU to execute commands without user knowledge as to the specifics of the hardware components.

Certain aspects of the disclosure relate to one or more API commands that allow a user (e.g., a computer programmer) to define and implement instruction culling. For example, the API commands may also a user to define cull buffer values that will be generated by an application after executing an instruction. The API commands can also instruct the GPU to store the one or more cull buffer values to a designated cull buffer. The API commands can also instruct the GPU to analyze the cull buffer before organizing and distributing instructions to the SPs. Upon receiving and executing the commands, the GPU generates and stores the one or more cull buffer values to a cull buffer, and culls irrelevant instructions before they are distributed to the SPs.

A variety of different GPGPU applications may benefit from irrelevant instruction culling. A non-limiting and simplified image processing application (e.g., a face detection application) is provided as an example of an application that may have multiple kernels, with one kernel having instructions that make instructions of another kernel irrelevant. An example face detection application includes three kernels for detecting different predefined features associated with a face included in an image (e.g., a frame of video data, a computer-generated graphics image, a still image, and the like).

In this example, each kernel may be implemented to identify a specific feature in pixels of the image (e.g., color, hue, saturation, brightness, or other properties) that is associated with a face. According to this example, any pixel or group of pixels in the frame of video data that satisfies all of the criteria set forth in the kernels is a face candidate. In addition, the kernels of this example are organized from more conservative to less conservative.

For example, a first kernel may identify many candidate face pixels in order to avoid excluding possible candidates. The second and third kernels, however, may be more aggressive in excluding pixels from being considered as candidate face pixels in order to sufficiently narrow the number of candidates. In this example, portions of kernels become irrelevant after each kernel is executed. For example, after executing the first kernel, only some pixels are identified as candidate face pixels, and the remaining pixels are excluded from consideration. Accordingly, any instructions associated with the excluded pixels in the second and third kernels are irrelevant. Those instructions, even if executed, do not contribute to identifying a face candidate.

As kernels are executed in the face detection example provided, the second and third kernels become sparse. For example, after each kernel is executed, more instructions of subsequent kernels are rendered irrelevant. The irrelevant instructions consume GPU resources even though they do not contribute to finding a face. According to aspects of the disclosure, a GPU can implement instruction culling in order to remove irrelevant instructions before the irrelevant instructions are distributed to SPs for execution. In this way, GPU efficiency is increased, because the SPs of the GPU implemented to execute irrelevant instructions.

When executing the face detection example provided, the GPU may first execute the first kernel and generate one or more cull buffer values. For example, SPs of the GPU may execute the instructions of the first kernel and populate a cull buffer with the cull buffer values that represent a characteristic of the executed instructions (e.g., whether a subsequent instruction is relevant or irrelevant) of the first kernel. Upon executing the second kernel, the GPU may utilize the values stored in the cull buffer to identify and cull irrelevant instructions from the second kernel. For example, the GPU may read the values stored in cull buffer 76 and determine whether to cull the instructions before the instructions are distributed to SPs 84 for execution. After the GPU has completed instruction culling, the GPU executes the second kernel and updates the cull buffer with new cull buffer values. The GPU may then repeat this example process to execute the third kernel.

Image processing is merely one example in which instructions of one kernel may make instructions of another kernel irrelevant. Other examples include, for instance, augmented reality applications, ray tracing, and pattern recognition. In general, a GPU can be implemented to carry out a variety of applications on a variety of input data. Kernels are application specific and provide only a framework for organizing instructions. Accordingly, it should be understood that the concept of culling irrelevant instructions is applicable to a variety of other applications.

Certain examples and aspects described herein refer to identifying and culling irrelevant work items and workgroups of different kernels before the work items and workgroups are distributed to SPs of a GPU. The kernel/workgroup/work item delineation, however, is merely one example of a GPGPU application structure. It should be understood that identifying irrelevant work items and workgroups, and generating, storing, and using work item and workgroup cull values are provided as an example only. Aspects of the disclosure related to identifying irrelevant instructions, and generating, storing, and using cull buffer values may be applied in other GPU application structures. For example, other GPU applications may include a single relatively larger "kernel" that includes instructions that use the same input data more than once during execution. In such an example, aspects of the disclosure may still be applied to maximize SP efficiency. Irrelevant instructions related to the same input data may be culled, despite the instructions belonging to the same kernel.

FIG. 1 is a block diagram illustrating a computing device 20 that may implement techniques for identifying and culling irrelevant instructions, such as work items and workgroups. As shown in FIG. 1, computing device 20 includes a host processor 24, a storage device 28, a memory 32, a network module 36, a user interface 40, and a display 44. Computing device 20 also includes a graphics processing unit (GPU) 48. Computing device 20 may, in some examples, include or be a part of a portable computing device (e.g. mobile phone, netbook, laptop, tablet device, digital media player, gaming device, or other portable computing device). Alternatively, computing device 20 may be configured as a stationary computing device, such as desktop computer, television, television set-top box, gaming console, or the like.

The illustrated computing device 20 of FIG. 1 is merely one example. Techniques for identifying and culling irrelevant instructions may be carried out by a variety of other computing devices having other components. In some examples, computing device 20 may include additional components not shown in FIG. 1 for purposes of clarity. For example, computing device 20 may include one or more communication bridges for transferring data between components of the computing device 20. Moreover, the components of computing device 20 shown in FIG. 1 may not be necessary in every example of computing device 20. For example, user interface 40 and display 44 may be external to computing device 20 in examples where computing device 20 is a desktop computer.

Host processor 24 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to host processor 24, in this disclosure, may be embodied as software, firmware, hardware or any combination thereof.

Host processor 24 processes instructions for execution within computing device 20. Host processor 24 may be capable of processing instructions stored on storage device 28 or instructions stored in memory 32. Example applications include applications for processing viewable images (e.g., filtering images, analyzing images for predefined features, and the like). Host processor 24 may execute the one or more applications based on a selection by a user via user interface 40. In some examples, host processor 24 may execute the one or more applications without user interaction.

According to some aspects of the disclosure, and as described in greater detail below with respect to GPU 48, host processor 24 may collaborate with GPU 48 to carry out applications. For example, host processor 24 may initialize execution of an application and delegate certain processing functions associated with the application to GPU 48. In an example, host processor 24 may initialize execution of an image processing application, and offload certain processing functions associated with the application to GPU 48.

Storage device 28 may include one or more computer-readable storage media. Storage device 28 may be configured for long-term storage of information. In some examples, storage device 28 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. Storage device 28 may, in some examples, be considered a non-transitory storage medium. The term "non-transitory" indicates that the storage medium is not embodied in a carrier wave or a propagated signal. However, the term "non-transitory" should not be interpreted to mean that storage device 28 is non-movable. As one example, storage device 28 may be removed from computing device 20, and moved to another device. As another example, a storage device, substantially similar to storage device 28, may be inserted into computing device 20.

Storage device 28 may store instructions for execution of one or more applications by host processor 24 or GPU 48. Storage device 28 may also store data for use by host processor 24 or GPU 48. For example, storage device 28 may store image data for processing by host processor 24 or GPU 48.

Memory 32 may be configured to store information within computing device 20 during operation. In some examples, memory 32 is a temporary memory, meaning that a primary purpose of memory 32 is not long-term storage. Memory 32 may, in some examples, be described as a computer-readable storage medium. Accordingly, memory 32 may also be considered "non-transitory," despite storing data that can change over time. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art.

In some examples, memory 32 may be used to store program instructions for execution by host processor 24 or GPU 48. Memory 32 may be used by software or applications running on computing device 20 to temporarily store information during program execution. As such, memory 32 may be accessed by other components of computing device 20 such as host processor 24 and GPU 48.

Computing device 20 may utilize network module 36 to communicate with external devices via one or more networks, such as one or more wireless networks. Network module 36 may be a network interface card, such as an Ethernet card, an optical transceiver, a radio frequency transceiver, or any other type of device that can send and receive information. In some examples, computing device 20 may utilize network module 36 to wirelessly communicate with an external device such as a server, mobile phone, or other networked computing device.

Computing device 20 also includes user interface 40. Examples of user interface 40 include, but are not limited to, a trackball, a mouse, a keyboard, and other types of input devices. User interface 40 may also include a touch-sensitive screen that is incorporated as a part of display 44. Display 44 may comprise a liquid crystal display (LCD), an organic light emitting diode (OLED) display, a plasma display, or another type of display device.

GPU 48 of computing device 20 may be a dedicated hardware unit having fixed function and programmable components for executing GPU applications. GPU 48 may also include a DSP, a general purpose microprocessor, an ASIC, an FPGA, or other equivalent integrated or discrete logic circuitry. GPU 48 may also include other components, such as dedicated memory, as described in greater detail with respect to FIG. 2. Furthermore, although shown as separate components in FIG. 1, in some examples, GPU 48 may be formed as part of host processor 24. GPU 48 may be configured to utilize processing techniques in accordance with a variety of application programming interfaces (APIs). For example, a user may program an application to be executed by GPU 48 using a standard software interface that can run on multiple platforms, operating systems, and hardware. In some examples, GPU 48 may be configured to utilize applications generated using OpenCL, CUDA, or the DirectX collection of APIs.

According to some examples, GPU 48 can be implemented as a general purpose graphics processing unit (GPGPU). For example, GPU 48 may carry out a variety of general purpose computing functions traditionally carried out by host processor 24. Examples include a variety of image processing functions, including video decoding and post processing (e.g., de-blocking, noise reduction, color correction, and the like) and other application specific image processing functions (e.g., facial detection/recognition, pattern recognition, wavelet transforms, and the like). In some examples, GPU 48 may collaborate with host processor 24 to execute applications. For example, host processor 24 may offload certain functions to GPU 48 by providing GPU 48 with instructions for execution by GPU 48.

When implemented as a GPGPU, GPU 48 and host processor 24 may execute an application that has one or more shader programs, referred to herein as kernels. Each kernel of an application can define a function for carrying out a specific task, and each kernel may be executed on the same input data. For example, GPU 48 and host processor 24 may execute an example image processing application that has a plurality of kernels for identifying features in the image, and each of the plurality of kernels may be executed on the image data to identify the features. Further, GPU 48 may execute applications that include kernels that are dependent on the results of other kernels. In such examples, the results of a kernel may make instructions of a subsequent kernel, such as work items and workgroups of a subsequent kernel, "irrelevant" (e.g., one or more instructions that do not advance the purpose of the application).

According to some aspects of the disclosure, GPU 48 may avoid executing irrelevant instructions by preventing the irrelevant instructions from being executed. For example, to prevent the irrelevant instructions from being executed, GPU 48 may "cull," or remove the instructions before they are executed. That is, GPU 48 may cull irrelevant work items and/or workgroups before they are executed. As described above, the term "work item" includes a basic unit of work for a GPU that may include one or more individual instructions, which define a function for processing input data. Moreover, the term "workgroup" refers generically to a predefined group of instructions, such as a predefined group of work items.

Accordingly, techniques of this disclosure generally include executing an application for processing input data using more than one kernel. Upon executing work items and workgroups of a first kernel, GPU 48 may set cull buffer values that represent whether the work items and workgroups of a second kernel are relevant. That is, GPU 48 may set cull buffer values based on the results of the first kernel, which represent whether respective work items and workgroups of a second kernel that are associated with the same input data of each of the work items and workgroups of the first kernel are relevant. Thus, after executing the first kernel, GPU 48 may utilize the cull buffer values to cull irrelevant work items and workgroups in the second kernel so that the irrelevant work items and workgroups are not executed.

Figure 2:
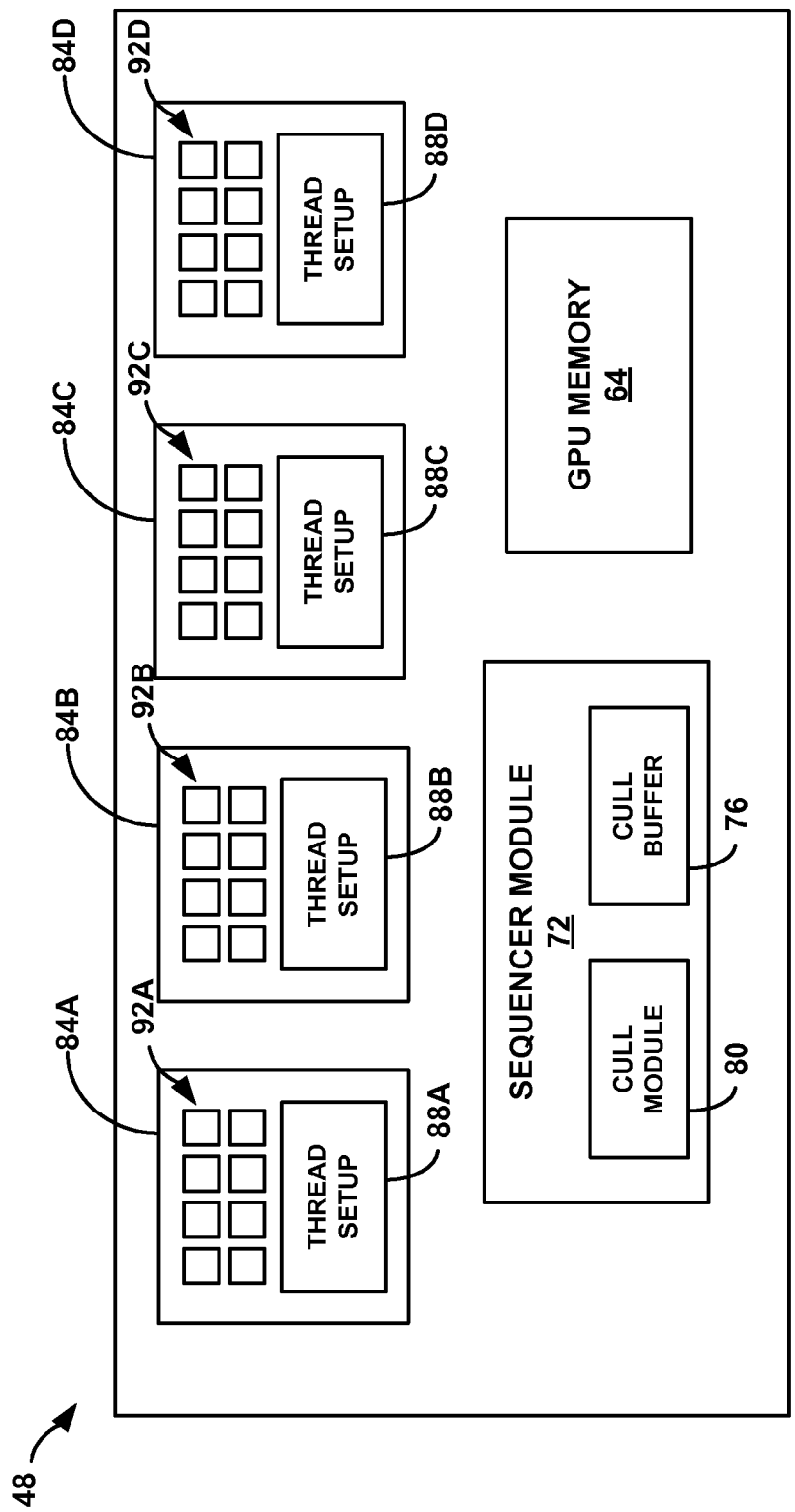
FIG. 2 is a block diagram illustrating the GPU shown in FIG. 1 in greater detail, which may be configured to carry out techniques for instruction culling according to aspects of the disclosure.

FIG. 2 is a block diagram illustrating the GPU 48 in greater detail, which may be configured to carry out techniques for instruction culling, such as culling work items and work groups. In the example shown in FIG. 2, GPU 48 includes a GPU memory 64 and a sequencer module 72 having a cull buffer 76 and cull module 80. GPU 48 also includes shader processors 84A-84D (collectively, "SPs" 84).

FIG. 2 is provided as merely one example of a GPU that can utilize techniques for instruction culling. Techniques for identifying and culling irrelevant instructions may be carried out by a variety of other GPUs having other components. For example, in other examples, GPU 48 may also include a variety of other modules related to analyzing and rendering images, such as a rasterizer module, texture units, one or more buffers, or other GPU components. In addition, GPU 48 may include more or fewer components than those shown in FIG. 2. For example, GPU 48 is shown in FIG. 2 as including four SPs 84. In other examples, however, GPU 48 may include more or fewer SPs 84 than those shown in FIG. 2.

GPU memory 64 may be a dedicated memory module within GPU 48 for storing instructions to be processed by GPU 48. In some examples, GPU memory 64 is similar to memory 32 shown in FIG. 1. For example, GPU memory 64 may be a temporary computer-readable storage medium. Examples of GPU memory 64 include random access memories (RAM), dynamic random access memories (DRAM), static random access memories (SRAM), and other forms of memories known in the art. In examples where GPU 48 is formed as part of another processor, such as host processor 24 shown in FIG. 1, GPU memory 64 may be accessed by components other than GPU 48.

GPU memory 64 may be configured as a global memory for GPU 48. For example, GPU memory 64 may be configured to store instructions and information within GPU 48 during operation (e.g., image data and instructions for processing by GPU 48). GPU memory 64 may also be configured to store results of data that has been processed by GPU 48.

Sequencer module 72 may initially prepare instructions and data for processing by SPs 84. For example, sequencer module 72 may receive instructions and data from a host processor, such as host processor 24 shown in FIG. 1, or GPU memory 64 and prepare input data to be processed by SPs 84. In some examples, sequencer module 72 receives one or more kernels of instructions that define functions that are to be carried out by GPU 48. The sequencer module 72 may organize the instructions into work items (e.g., a basic unit of work) and group the work items into workgroups.

Sequencer module 72 may also be implemented to control instruction and data flow within GPU 48. For example, sequencer module 72 may route instructions and associated data to SPs 84 for execution. Sequencer module 72 may be comprised of a combination of fixed function and programmable components for distributing instructions (e.g., work items and workgroups) and associated input data to SPs 84. According to some aspects of the disclosure, sequencer module 72 includes a cull module 76 and a cull buffer 80 for identifying irrelevant instructions and preventing the irrelevant instructions from being processed by SPs 84 of the GPU 48. That is, sequencer module 72 may include a cull module 76 and a cull buffer 80 for identifying irrelevant work items and work groups and preventing the irrelevant work items and work groups from being processed by SPs 84 of the GPU 48.

In the example shown in FIG. 2, the SPs 72 each include a thread setup module 88A-88D (collectively, thread setup modules 88), as well as a plurality of arithmetic logic units ("ALUs") 92A-92D (collectively, ALUs 92). SPs 72 may be referred to as "unified shader processors," in that the SPs 72 can perform geometry, vertex, or pixel shading operations to render graphics. SPs 72 can also be used to perform general purpose calculations when executing instructions of a GPGPU application. For example, SPs 72 may receive instructions from sequencer module 76 and execute the instructions.

In some examples, thread setup module 88 of SPs 84 is responsible for receiving instructions from sequencer module 72 and generating threads for execution by ALUs 92. For example, thread setup module 88 may receive instructions (e.g., a workgroup of work items) from sequencer module 72, temporarily store the instructions, generate threads, i.e., work items, for execution by the ALUs 92, and distribute the threads to the ALUs 92. According to some aspects, thread setup module 88 distributes threads to the ALUs 92 in such a way that allows ALUs 92 to process more than one thread in parallel. Performance and efficiency of GPU 48 may be maximized by continuously occupying ALUs 92 of SPs 84 with relevant threads (e.g., threads having relevant instructions).

According to some aspects of the disclosure, GPU 48 may increase efficiency by implementing sequencer module 72 to identify "irrelevant" instructions (e.g., an instruction that does not advance the purpose of an application) and prevent the irrelevant instructions from being processed by SPs 84. For example, to prevent an irrelevant work item from being processed, sequencer module 72 may cull, or remove, irrelevant work items before routing the instructions to SPs 84. Accordingly, thread setup module 88 of SPs 84 does not generate threads that include irrelevant work items, and the ALUs 92 of SPs 84 are not occupied executing irrelevant work items.

Sequencer module 72 may implement cull buffer 76 and cull module 80 to carry out instruction culling. Although described and represented as two distinct modules in FIG. 2, in some examples, cull buffer 76 and cull module 80 may be implemented in the same component. Further, according to some examples, cull buffer 76 and cull module 80 may not be implemented as distinct components. Rather, in some examples, cull buffer 76 and cull module 80 may be integrated into other components of GPU 48. For example, cull buffer 76 may be implemented as a partition of GPU memory 64. In another example, cull buffer 76 may be a memory that is external to GPU 48. Alternatively or additionally, the instruction culling techniques described with respect to cull module 80 may be integrated into sequencer module 72 or SPs 84.

Cull buffer 76 may store one or more values that represent a characteristic of an executed work item. The characteristic can be used to determine whether a subsequent work item associated with a subsequent kernel is relevant or irrelevant. For example, GPU 48 may execute an application having two kernels. After executing the first kernel, the GPU 48 may store one or more values to cull buffer 80 that represents whether, based on the results of the first kernel, the work items of the second kernel are relevant.

Cull buffer 76 may receive input defining the cull buffer values from a variety of sources. In one example, after one of the SPs 84, such as SP 84A, executes a work item, SP 84A may write one or more cull buffer values to cull buffer 76 based on the result of the executed work item directly. In another example, cull buffer 76 may receive cull buffer values from programmable or fixed function hardware, as described above.

According to some aspects, cull buffer 76 may be designed to store one or more values that represent a characteristic of a workgroup, as well as one or more values that represent a characteristic of individual work items within the workgroup. For example, cull buffer 76 may store a workgroup cull value that represents that all of the work items of the particular workgroup are irrelevant if all of the work items of a given workgroup are rendered irrelevant by a previously executed kernel. Alternatively or additionally, cull buffer 76 may store one or more work item cull values that represent that only some of the work items of a given workgroup are rendered irrelevant by a previously executed kernel. Accordingly, the values stored in cull buffer 76 can be used to determine characteristics (e.g., such as the relevancy of an instruction) on both a workgroup level and a work item level.

Cull buffer 76 may have a variety of different capacities, with greater capacities offering additional capabilities. In one example, cull buffer 76 may include a single bit of storage for each work item of a kernel. In this example, the single bit of storage may be used to store a binary value that represents a single characteristic of each work item of a kernel. GPU 48 may use the single characteristic to identify whether a work item is relevant or irrelevant based on a result of a previously executed work item.

In other examples, cull buffer 76 may include more than a single bit of storage for each work item of a kernel. For example, more than one value may be stored in cull buffer 76 to describe a variety of characteristics of each work item of a kernel. In a non-limiting image processing example, GPU 48 may execute a work item on pixel data to determine Red Green Blue (RGB) characteristics of the pixel data. Accordingly, cull buffer 76 may include storage that allows three values to be stored that corresponding to the red, green, and blue components of the executed work item. In this example, GPU 48 and cull module 80 may cull work items based on any of the values stored in cull buffer 76. It should be understood that the configuration (e.g., capacity and capability) of cull buffer 76 may be application and GPU dependent. For example, some GPUs may be designed to provide a relatively large amount of memory for a relatively large and multifunctional cull buffer. Other GPUs may not be capable of providing such versatility. Accordingly, it should be understood that the examples provided are not the only configurations of cull buffers that may be implemented.

Cull module 80 may be responsible for accessing values stored in cull buffer 76 and culling irrelevant instructions based on the values stored in cull buffer 76. According to some examples, cull module 80 accesses the values stored in cull buffer 76 before sequencer module 72 prepares and distributes instructions to SPs 84. As described in greater detail with respect to FIG. 7, cull module 80 may read values stored in cull buffer 76 and cull instructions on both a work item and workgroup level. For example, cull module 80 may read values stored in cull buffer 76 and determine that an entire workgroup of work items is irrelevant based on the values. Cull module 80 may also read the values stored in cull buffer 76 and determine that individual work items are irrelevant based on the values. After cull module 80 has culled irrelevant instructions, sequencer module 72 can prepare and distribute the remaining instructions to SPs 84.

Aspects of the disclosure relate to GPU 48 utilizing cull buffer 76 and cull module 80 to cull irrelevant instructions when executing an application having more than one kernel that processes the same input data. In an example, GPU 48 receives instructions and data defining a plurality of kernels from a host processor, such as host processor 24 shown in FIG. 1, or other computing unit. Upon receiving the kernels, sequencer module 72 may initially prepare the instructions and data associated with a first kernel for processing by SPs 84. For example, the sequencer module 72 may organize the instructions of the first kernel into work items and workgroups.

Upon generating the grids of workgroups, cull module 80 of sequencer module 72 may query cull buffer 76 to determine whether to perform instruction culling. According to some examples, cull module 80 does not perform instruction culling on a first kernel of instructions, because in some examples, cull buffer values are generated based on the results of executed instructions. Accordingly, cull buffer 76 is empty before execution of the first kernel. Sequencer module 72 proceeds to distribute instructions (e.g., workgroups and work items) associated with the first kernel to SPs 84, which execute the instructions.

After SPs 84 have executed the instructions of the first kernel, SPs 84 populate or update cull buffer 76 with cull buffer values. For example, SPs 84 may populate cull buffer 76 with one or more values that represent a characteristic of an executed work item of the first kernel. The characteristic can be used to determine whether a subsequent work item associated with the next kernel is relevant or irrelevant.

GPU may then continue by executing a second kernel. For example, sequencer module 72 may prepare instructions and data associated with the second kernel for processing by SPs 84 by organizing one or more grids of workgroups associated with the second kernel. Cull module 80 then queries cull buffer 76 to identify instructions for culling. For example, cull module 80 reads the values stored in cull buffer 76 and determines whether to cull instructions before the instructions are distributed to SPs 84 by sequencer module 72. In some examples, cull module 80 culls instructions on both a work item and workgroup basis. After cull module 80 has completed instruction culling, sequencer module 72 distributes the instructions to SPs 84, which execute the instructions and update the values of cull buffer 76. This example process may be repeated until GPU 48 has executed all kernels.

The example described with respect to FIG. 2 refers to sequencer module 72 performing all instruction culling (e.g., work item culling and workgroup culling) using cull buffer 76 and cull module 80. It should be understood, however, that other modules of GPU 48 may be responsible for instruction culling, and other modules may interact with cull buffer 76. According to one example, sequencer module 72 may be responsible for performing workgroup culling only, while thread setup modules 88 of SPs 84 are responsible for work item culling. For example, sequencer module 72 may perform workgroup culling using cull buffer 76 and cull module 80, as described above. After performing workgroup culling, sequencer module 76 may distribute the remaining workgroups (e.g., the workgroups remaining after culling) to SPs 84. In this example, thread setup modules 88 may be responsible for work item culling. For example, after receiving a workgroup from sequencer module 72, the thread setup modules 88 may utilize the cull buffer 76 to perform work item culling. According to some aspects, the thread setup modules 88 read cull buffer 76 and determine whether to cull work items based on the one or more values stored in cull buffer 76. In addition, the thread setup modules 88 may remove irrelevant work items prior to organizing threads for execution by ALUs 92 based on the cull buffer values stored in cull buffer 76.

According to some aspects, to enable instruction culling in GPU 48, GPU 48 executes an application having instruction culling commands. For example, GPU 48 executes instruction culling commands such that when executing an instruction, GPU 48 generates both a result, as well as one or more values for storing in cull buffer 76 that represent a characteristic of the result. GPU 48 may also execute instruction culling commands that enable cull module 80 to read the values of cull buffer 76 and perform instruction culling.

Certain aspects of the disclosure relate to one or more API commands that allow a user (e.g., a computer programmer) to create an application having instruction culling commands. For example, the API commands can also be used to instruct the GPU 48 to generate and store one or more cull buffer values to a designated cull buffer, such as cull buffer 76. The API commands can also instruct the GPU 48 to analyze cull buffer values before organizing and distributing instructions to the SPs 84, as well as perform instruction culling based on the values. For example, the API commands can instruct GPU 48 to discard instructions that are not relevant based on the cull buffer values so that the instructions are not distributed to SPs 84 of GPU 48.

Figure 3:
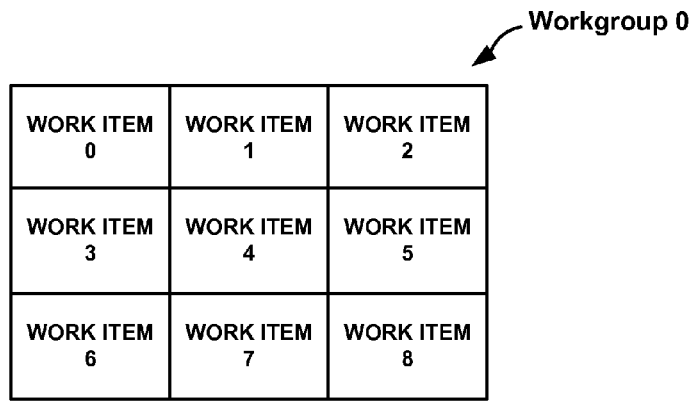
FIG. 3 is a block diagram illustrating a grid of work items that is associated with a workgroup, according to aspects of the disclosure.

FIG. 3 is a block diagram illustrating a grid of work items that is associated with a workgroup, represented in FIG. 3 as Workgroup 0. Again, each work item may relate to an individual instruction (e.g., a basic unit of work) that can be executed by an SP of a GPU, such as one of the SPs 84 of GPU 48. For purposes of illustration only, the work items shown in FIG. 3 are described with respect to the example GPU 48 shown in FIG. 2.

Work items, such as the work items shown in Workgroup 0 of FIG. 3, may be organized into threads (e.g., one or more instructions organized in a configuration that provides efficient execution by ALUs) before being executed by SPs 84. For example, one of the SPs 84, such as SP 84A, may receive Workgroup 0 from sequencer module 72 and prepare the Workgroup 0 for execution by generating threads using the work items associated with Workgroup 0.

According to some examples, the efficiency of SPs 84 may be impacted by the relevance of the work items that are organized into threads. For example, the efficiency of SPs 84 may be negatively impacted if threads are generated with, and SPs 84 are occupied executing, irrelevant work items. In some examples, workgroups of a multi-kernel program may become "sparse," based on the results of previously executed instructions. For example, a "sparse" workgroup may include relevant work items that are separated by one or more irrelevant work items. In the example shown in FIG. 3, Workgroup 0 may be considered "sparse" if several work items are rendered irrelevant by a previously executed instruction.

Aspects of the disclosure relate to identifying irrelevant work items, and removing the irrelevant work items before the work items are organized into threads. In some examples, work items may be culled prior to being distributed to SPs 84. For example, cull module 80 may utilize values stored in cull buffer 76 to determine whether to cull a work item before the work item is distributed to SPs 84. In some examples, GPU 48 may perform workgroup culling, as described with respect to FIG. 4, prior to performing work item culling.

Figure 4:
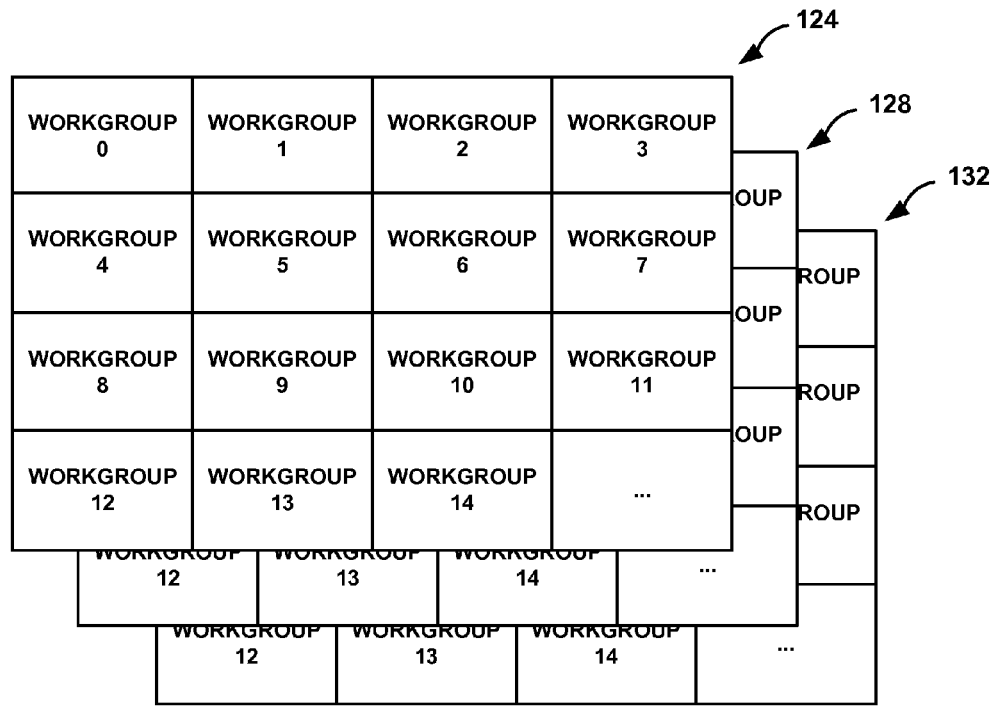
FIG. 4 is a block diagram illustrating grids of workgroups in an arrangement of three kernels, according to aspects of the disclosure.

FIG. 4 is a block diagram illustrating grids of workgroups in an arrangement of three kernels (e.g., a first kernel 124, a second kernel 128, and a third kernel 132) that can be executed by a GPU, such as GPU 48 shown in FIG. 2. Again, each kernel 124-132 may be executed to perform a specific function related to a given application. In some examples, the kernels 124-132 may define functions for color correction algorithms, face detection algorithms, pattern recognition algorithms, augmented reality applications, a variety of algorithm applications (e.g., wavelet transforms, Fourier transforms, and the like), or a variety of other applications. For purposes of illustration only, FIG. 4 is described with respect to the example GPU 48 shown in FIG. 2.

The grids of workgroups shown in FIG. 4 may be generated by sequencer module 72. For example, sequencer module 72 may receive instructions and data from a host processor, such as host processor 24 shown in FIG. 1, or GPU memory 64 and prepare the instructions for execution by organizing the instructions into grids of workgroups. In some examples, the workgroups of each of the kernels 124-132 relate to the same input data. For example, the Workgroup 0 of kernel 124 includes instructions associated with the same input data as Workgroup 0 of kernel 128, as well as Workgroup 0 of kernel 132. In addition, GPU 48 may execute kernels 124-132 in succession, such that kernel 124 is executed prior to kernel 128, and kernel 128 is executed prior to kernel 132.

According to some aspects of the disclosure, the results of one or more workgroups of one kernel may render workgroups of another kernel irrelevant. For example, GPU 48 may execute Workgroup 0 of kernel 124, and the results of Workgroup 0 of kernel 124 may render the instructions associated with Workgroup 0 of kernel 128 irrelevant. Workgroup 0 of kernel 128 may be considered irrelevant if the instructions associated with Workgroup 0 do not advance an overreaching goal of kernels 124-132. For example, in an example image processing application, one overreaching goal of kernels 124-132 may be to identify a human face in the image.

Aspects of the disclosure may be implemented to cull, or remove, irrelevant workgroups before the workgroups can be executed. In the example described above, GPU 48 may remove the irrelevant Workgroup 0 before Workgroup 0 can be distributed to SPs 84. For example, cull module 80 may utilize values stored in cull buffer 76 to determine that Workgroup 0 is irrelevant, and cull Workgroup 0 before it can be distributed to SPs 84.

Figure 5A:
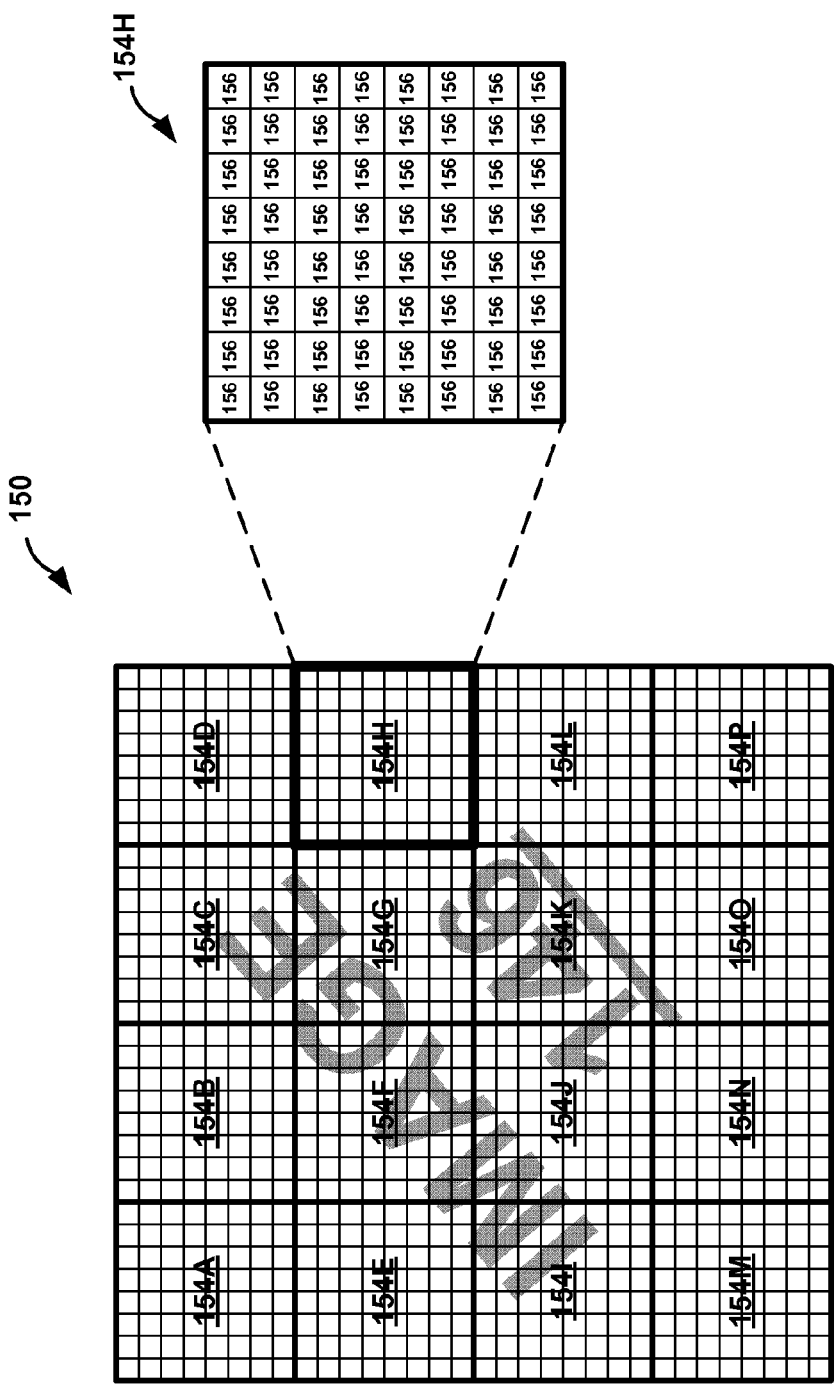
FIG. 5A is a block diagram illustrating a first kernel for processing an image, according to aspects of the disclosure.
Figure 5B:
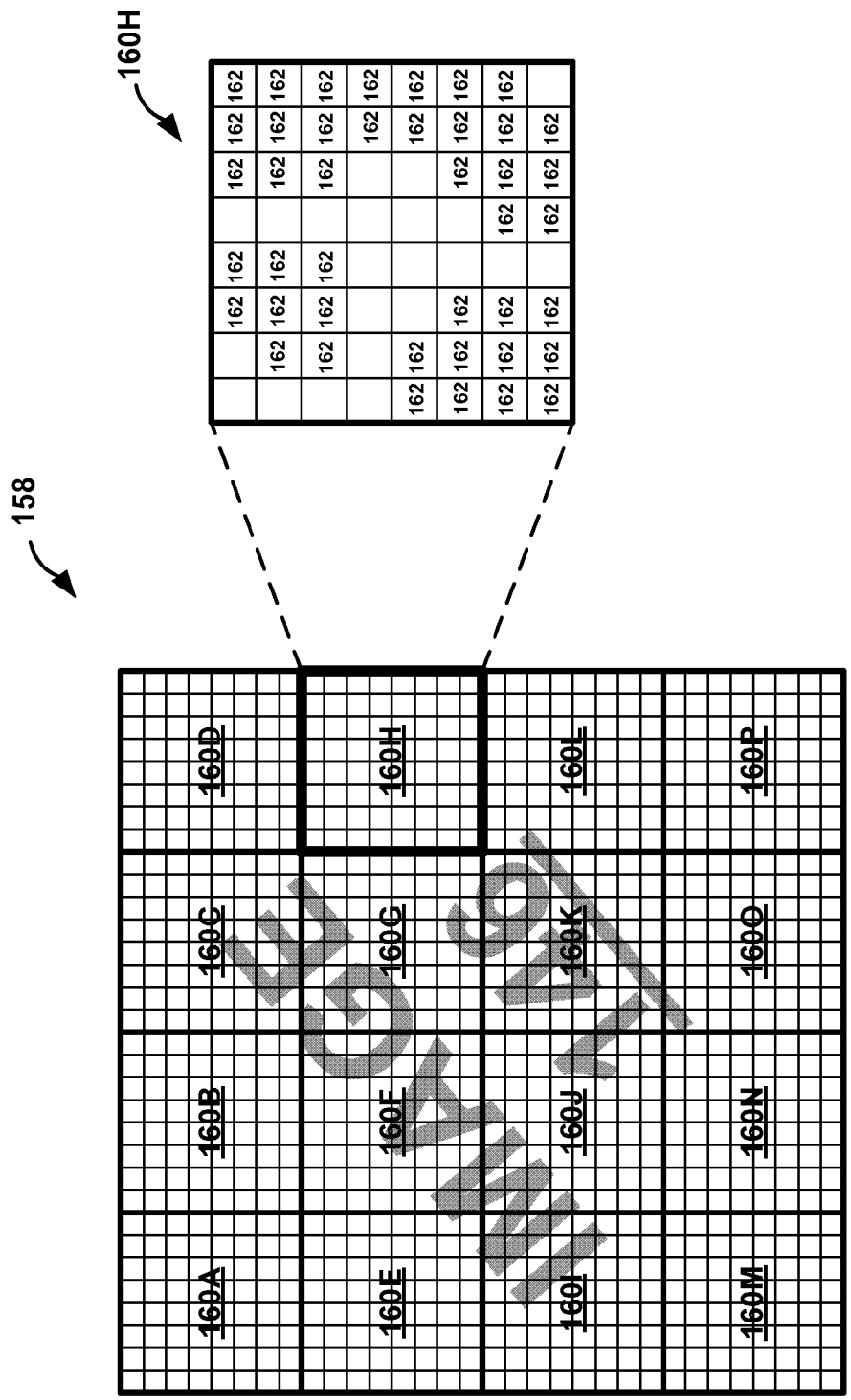
FIG. 5B is a block diagram illustrating instruction culling on a second kernel for processing the image shown in FIG. 5A, according to aspects of the disclosure.
Figure 5C:
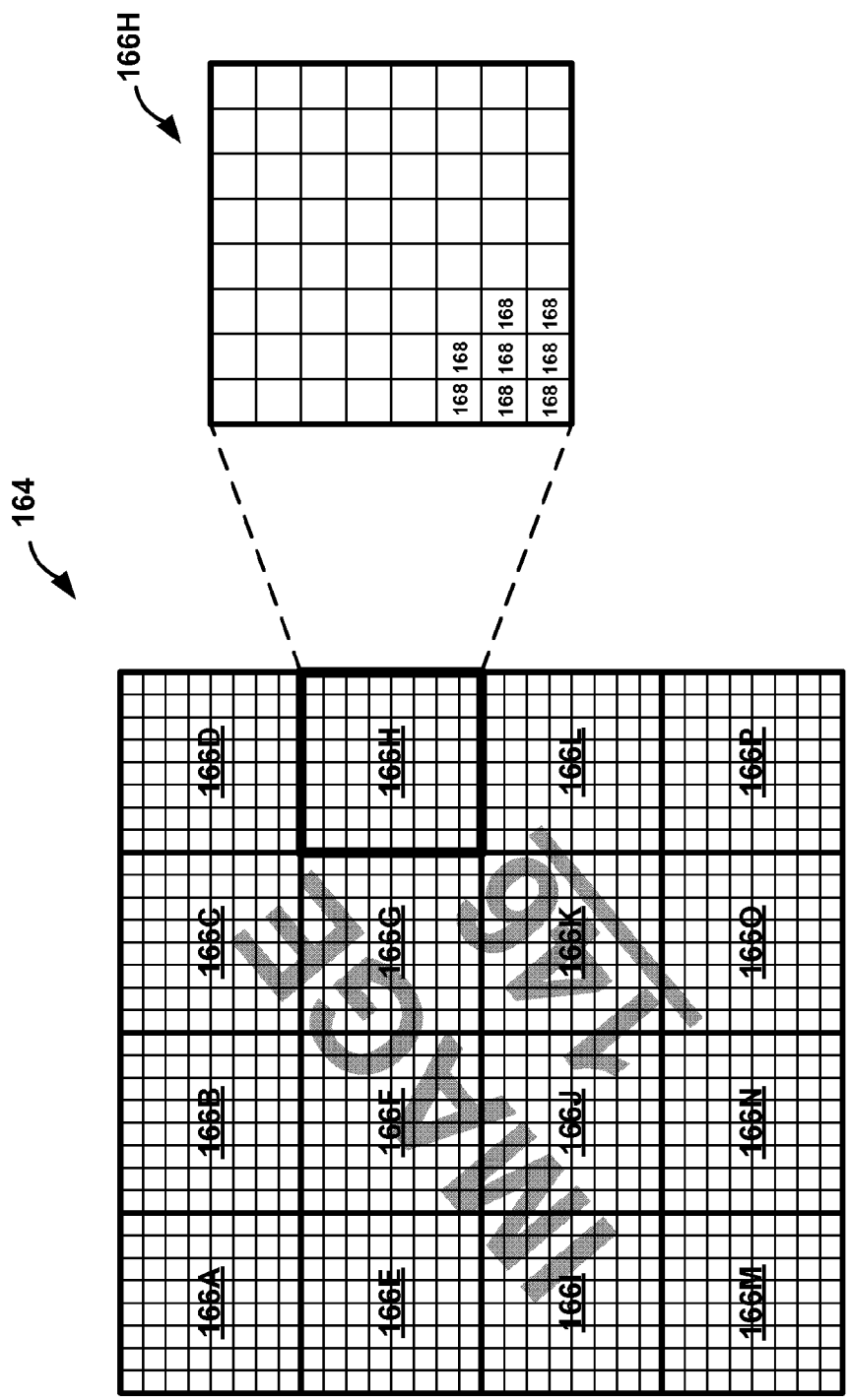
FIG. 5C is a block diagram illustrating instruction culling on a third kernel for processing the image shown in FIG. 5A, according to aspects of the disclosure.

As mentioned, according to one application-specific implementation, GPU 48 may execute kernels 124-132 to carry out a specific task on an image, such as the image shown in FIGS. 5A-5C.

FIGS. 5A-5C are block diagrams illustrating an example image 146 being processed with three kernels (e.g., kernel 150 as shown in FIG. 5A, kernel 158 as shown in FIG. 5B, and kernel 164 as shown in FIG. 5C). For example, the kernels 150, 158, and 164 each include instructions for processing image data associated with image 146. For purposes of illustration only, FIGS. 5A-5C are described with respect to the example GPU 48 shown in FIG. 2.

According to the example shown in FIGS. 5A-5C, image 146 is a square, approximately 16 megabyte (MB) image that includes 1024 pixels. Each kernel 150, 158, and 164 includes work items (e.g., represented as relatively smaller blocks) that may be related to a particular pixel of image. Accordingly, when GPU 48 executes a work item, the corresponding pixel of image 146 may be processed (e.g., analyzed) according to the instruction associated with the work item.

Each kernel 150, 158, and 164 also includes workgroups (e.g., represented as relatively larger blocks) that include instructions related to a particular group of pixels of image 146. The relationships between pixel data, work items, and workgroups described with respect to FIGS. 5A-5C are merely an example of possible instruction structures. In other examples, a work item may relate to more or less than one pixel of image 146.

According to one non-limiting example, kernels 150, 158, and 164 are implemented as part of a face detection application for detecting one or more human faces in image 146. In this example, kernels 150, 158, and 164 are implemented to identify pixels that include certain predetermined properties (e.g., color, hue, saturation, brightness, or other properties) that are associated with a human face. GPU 48 may identify any pixel or group of pixels in image 146 that satisfy all of the criteria set forth in kernels 150, 158, and 164 as candidate pixels of a face. For example, if a pixel does not include the feature of kernel 150, the instructions related to that pixel in kernel 158 and kernel 164 are rendered irrelevant.

As shown and described in greater detail with respect to FIGS. 5A-5C, as GPU 48 executes each of the kernels 150, 158, and 164, relevant instructions associated with subsequent kernels become increasingly "sparse." For example, after each kernel is executed, more instructions of subsequent kernels are rendered irrelevant, because GPU 48 identifies more pixels that do not include the predetermined characteristics of face pixels. According to aspects of the disclosure, GPU 48 can implement instruction culling in order to remove irrelevant instructions before the irrelevant instructions are distributed to SPs 84 for execution. In this way, the efficiency of GPU 48 is increased, because SPs 84 are not occupied executing irrelevant instructions.

FIG. 5A is a block diagram illustrating the first kernel 150 for processing image 146. As shown in FIG. 5A, the first kernel includes workgroups 154A-154P (collectively, workgroups 154), which each include a plurality of work items 156. GPU 48 may execute the first kernel 150 by executing all of the work items 156 associated with workgroups 154A-154P. For example, GPU 48 may receive the first kernel 150 from a host processor, such as host processor 24 shown in FIG. 1, or another computing unit. Upon receiving the first kernel 150, sequencer module 72 may organize the first kernel 150 into workgroups 154.

Sequencer module 72 may then proceed to distribute all workgroups 154 and work items 156 to SPs 84. The SPs 84 then execute the workgroups 154 and associated work items 156, and populate cull buffer 76 with one or more cull buffer values. The cull buffer values may represent a characteristic of an executed work item of the first kernel 150. The characteristic can be used to determine whether a subsequent instruction associated with the next kernel is relevant or irrelevant. For example, if the result of a particular work item indicates that the pixel associated with the particular work item does not include the desired predefined property of kernel 150, such as a predefined color, hue, saturation, brightness, or other property, the SP responsible for executing the instruction may store a value to cull buffer 76 indicating that subsequent work items associated with that pixel are irrelevant. If the same SP is responsible for executing an entire workgroup, the SP may also store a value to cull buffer 76 indicated that pixels associated with an entire workgroup are irrelevant. After GPU 48 has executed kernel 150 and populated cull buffer 76, GPU 48 may proceed to execute kernel 158, as shown in FIG. 5B.

FIG. 5B is a block diagram illustrating instruction culling on the second kernel 158, according to aspects of the disclosure. According to some aspects of the disclosure, before culling, the second kernel 158 originally includes workgroups 160A-160P that correspond to workgroups 154A-154P shown in FIG. 5A (collectively, workgroups 160). In addition, before culling, each of the workgroups 160 originally include a full set of work items 162, which correspond to work items 156 shown in FIG. 5A. The workgroups 160 and work items 162 may be executed on the same input data, i.e., the image 146, as first kernel 150 shown in FIG. 5A.

In the example shown in FIG. 5B, GPU 48 performs instruction culling on irrelevant workgroups 160 and work items 162 from the second kernel 158. For example, after executing the first kernel 150, GPU 48 may identify a number of pixels that do not include the predetermined property of kernel 150. Subsequent workgroups and work items associated with those pixels can be considered irrelevant to detecting a face in image 146. GPU 48 may be used to perform instruction culling on the irrelevant workgroups and work items.

According to some aspects of the disclosure, GPU 48 culls instructions by implementing cull buffer 76 and cull module 80 on both a work item and workgroup basis. For example, after executing the first kernel 150, GPU 48 may determine that subsequent instructions for pixels in the locations of workgroups 154M-154P are irrelevant. In addition, GPU 48 may determine that subsequent instructions for certain pixels within workgroup 154H (shown in FIG. 5A) are irrelevant. Accordingly, GPU 48 stores values to cull buffer 76, which indicate that the pixel data associated with workgroups 160M-160P and certain work items 162 are irrelevant. Upon executing kernel 158, GPU 48 can cull workgroups 160M-160P and certain work items 162 using cull module 80.

After cull module 80 has completed instruction culling, sequencer module 72 organizes the remaining instructions and distributes the instructions to SPs 84. For example, according to some aspects, SPs 84 are configured to receive instructions that are organized in a way that allows the instructions to be easily distributed in parallel to ALUs 92, which may be GPU dependent. Accordingly, sequencer module 72 may reorganize the instructions associated with the second kernel 158 to optimize the distribution and execution processes.

After receiving the culled set of instructions, SPs 84 execute the instructions. In addition, SPs 84 may update the value in cull buffer 76. For example, if the result of a particular work item 162 indicates that the pixel associated with the particular work item 162 does not include the desired predefined property of kernel 158, the SP responsible for executing the work item 162 may store a value to cull buffer 76 indicating that subsequent work items associated with that pixel are irrelevant. If the same SP is responsible for executing an entire workgroup, the SP may also store a value to cull buffer 76 indicated that pixels associated with an entire workgroup are irrelevant. After GPU 48 has executed kernel 158 and populated cull buffer 76, GPU 48 may proceed to execute kernel 164, as shown in FIG. 5C.

FIG. 5C is a block diagram illustrating instruction culling on the third kernel 164, according to aspects of the disclosure. According to some aspects of the disclosure, before culling, the third kernel 164 originally includes workgroups 166A-166P that correspond to workgroups 154A-154P shown in FIG. 5A (collectively, workgroups 166). In addition, before culling, each of the workgroups 166 originally include a full set of work items 168, which correspond to work items 156 shown in FIG. 5A. The workgroups 166 and work items 168 are executed on the same input data, i.e., the image 146, as first kernel 150 shown in FIG. 5A and the second kernel 158 shown in FIG. 5B.

As shown in FIG. 5C, GPU 48 may carry out instruction culling before executing the third kernel 164, further reducing the number of instructions for processing by SPs 84 of GPU 48. For example, after executing the second kernel 158, GPU 48 may determine that subsequent instructions for pixel data in the locations of workgroups 158A, 158B, 158E, 158I, and 158M-158P are irrelevant. In addition, GPU 48 may determine that subsequent instructions for certain pixel data within workgroup 158H (shown in FIG. 5B) are irrelevant. Accordingly, GPU 48 updates values in cull buffer 76, which indicate that the pixel data associated with workgroups 166A, 166B, 166E, 166I, and 166M-166P and certain work items 168 are irrelevant. Upon executing kernel 164, GPU 48 can cull workgroups 166A, 166B, 166E, 166I, and 166M-166P and certain work items 168 using cull module 80, and execute the remaining instructions, as described with respect to FIG. 5B.

As the example shown in FIG. 5A-5C illustrates, instruction culling may greatly reduce the number of computations for a GPU when an application includes some instructions that render others irrelevant. Culling instructions may increase overall efficiency of GPU, because GPU does not have to devote resources to distributing and executing irrelevant instructions.

FIGS. 5A-5C generally describe GPU 48 culling instructions on both a work item and a workgroup level. In other examples, however, GPU 48 may perform either work item culling or workgroup culling. In addition, FIGS. 5A-5C also describe instruction culling on a kernel-by-kernel basis. For example, GPU 48 may cull instructions only after executing all workgroups and all work items of a kernel. In other examples, however, GPU 48 may perform instruction culling in other intervals. According to some aspects, GPU 48 may perform instruction culling at any time before executing an instruction that may be based in some way on another, previously executed instruction.

Figure 6:
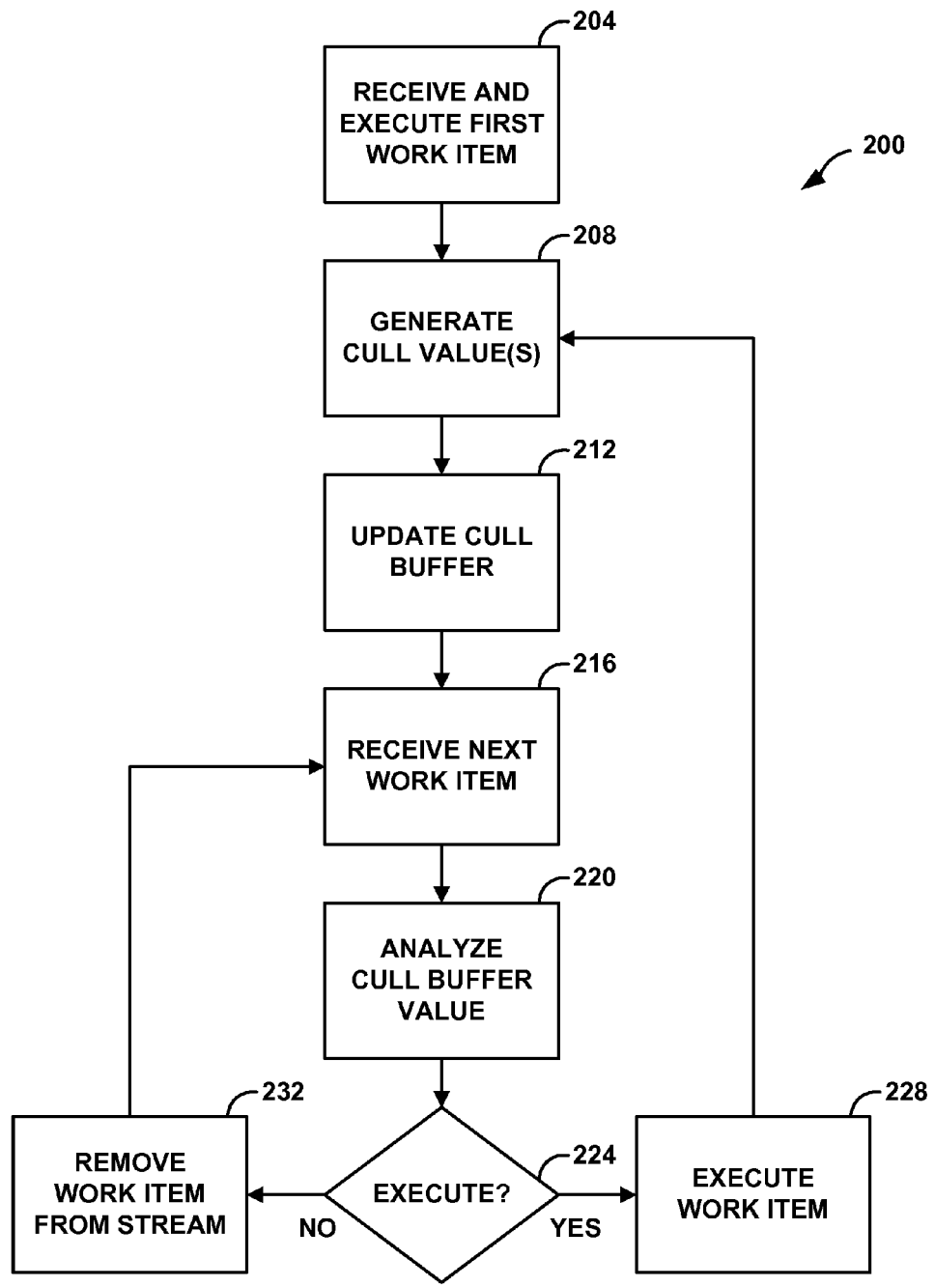
FIG. 6 is a flow chart illustrating a method of culling instructions, according to aspects of the disclosure.

FIG. 6 is a flow chart illustrating a method 200 of culling instructions, according to aspects of the disclosure. In some examples, method 200 may be carried out by a GPU, such as GPU 48 shown in FIG. 2. Accordingly, for purposes of illustration only, method 200 is described as being carried out by the example GPU 48 shown in FIG. 2.

According to aspects of the disclosure, GPU 48 performs instruction culling after executing one or more instructions. GPU 48 initially receives one or more instructions from, for example, a host processor such as host processor 24 shown in FIG. 1. After receiving, for example, a first work item, GPU 48 executes the first work item (204). In some examples, GPU 48 may execute the first work item by distributing the work item to SPs 84 with sequencer module 72. The SPs 84 may then execute the work item by constructing one or more hardware threads and distributing the hardware threads to ALUs 92 for execution.

After the first work item has been executed, GPU 48 generates one or more cull values (208). The cull buffer value may represent a characteristic of the executed work item. In some examples, the characteristic can be used to determine whether a subsequent work item associated with the same input data as the first work item is relevant or irrelevant. Again, a work item may be considered irrelevant if it does not advance the goal or purpose of an application that the instruction is incorporated in. For example, in an image processing context, such as the face detection example described with respect to FIGS. 5A-5C, work items may be considered irrelevant if they do not advance the purpose of identifying a face in an image.

In one example, the cull buffer value may be a single binary value that represents whether the subsequent work item is relevant or irrelevant. In other examples, more than one cull buffer value may be stored for a single work item. For example, more than one cull buffer value may be stored for a single work item, where each cull buffer value corresponds to a different characteristic of an executed work item. In a non-limiting image processing example, GPU 48 may execute a work item on pixel data to determine Red Green Blue (RGB) characteristics of the pixel data. Accordingly, three cull buffer values may be stored that correspond to the red, green, and blue components of the executed work item. In this example, GPU 48 and cull module 80 may cull work items based on any of the values stored in cull buffer 76. After generating the cull buffer value, GPU 48 may populate buffer, such as cull buffer 76 with the one or more cull values (212).

GPU 48 then receives another work item (216). In some examples, the second work item depends on the first work item and is associated with the same input data as the first work item. For example, the second work item may only be relevant if a result of the first work item evaluates to a certain predetermined value, or one of a plurality of predetermined values. Upon receiving the second work item, GPU 48 may analyze the cull buffer value associated with the second work item (220). According to some aspects, GPU 48 indexes the cull buffer values such that GPU 48 can identify that the second work item corresponds to the same input data and depends on the first work item. Accordingly, GPU 48 can determine whether to execute the second work item based on the cull buffer value (224).

According to some examples, GPU 48 may execute the second work item if GPU 48 determines that the second work item is relevant based on the cull buffer value (228). After executing the second work item, GPU 48 may begin repeating the process by generating a cull value that represents a characteristic of the result of the second work item (step 208). Alternatively, GPU 48 may not execute the second work item if GPU 48 determines that the second work item is irrelevant based on the cull buffer value, and may discard the second work item (232). If GPU 48 does not execute the second work item, GPU 48 may proceed directly to receiving the next work item (216).

The method of FIG. 6 describes instruction culling on a per-work item basis. For example, work items are described as being individually executed, the cull values are described as being individually generated, and the like. It should be understood, however, that in practice a GPU may execute more than one instruction in parallel. According, more than one value may be written to cull buffer 76 substantially concurrently. In addition, GPU may analyze more than one cull buffer value as they relate to new instructions substantially concurrently. As described with respect to FIGS. 5A-5C, in some examples, GPU 48 may perform instruction culling after executing a certain number of instructions (e.g., after executing a kernel of instructions), and may perform instruction culling on an individual work item or group (e.g., workgroup) basis.

Figure 7:
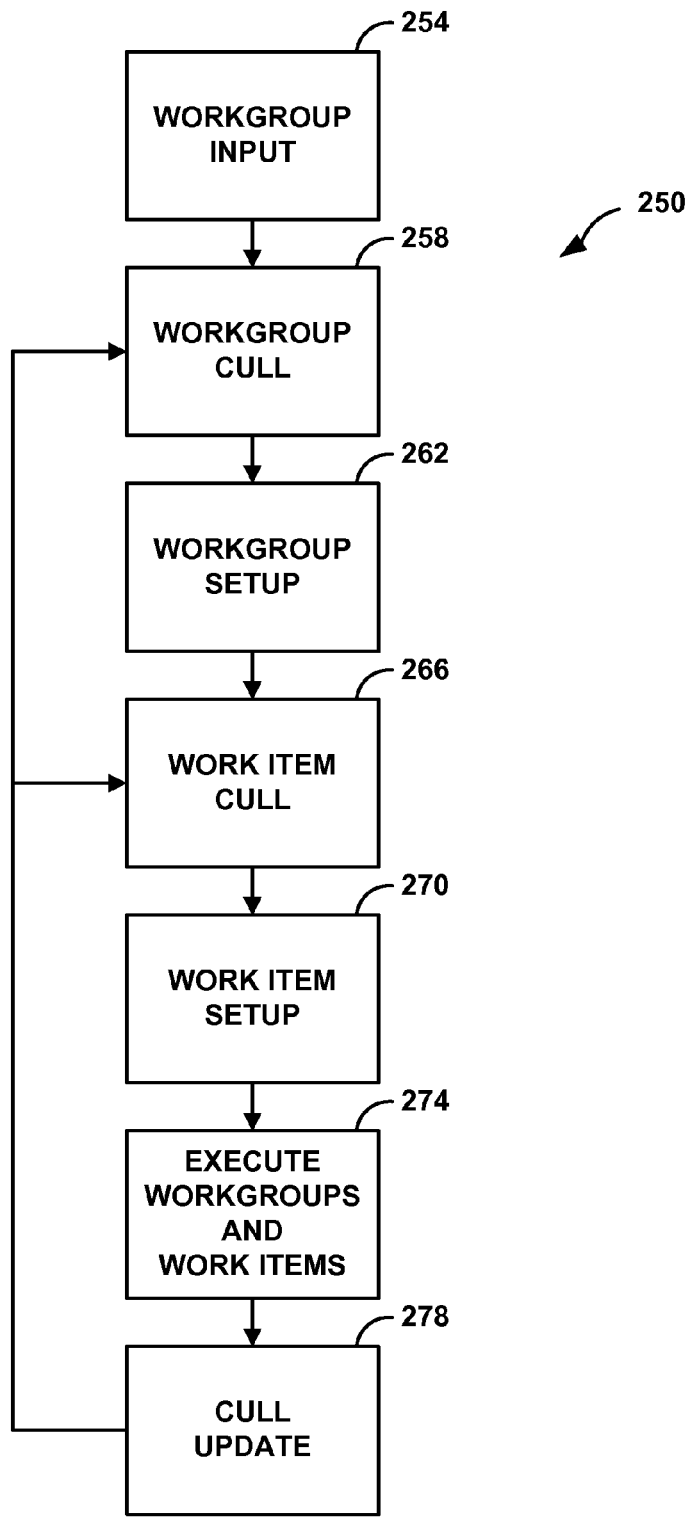
FIG. 7 is a flow chart illustrating an instruction flow that may be implemented to cull instructions, according to aspects of the disclosure.

FIG. 7 is a flow chart illustrating an instruction flow 250 that may be implemented to cull instructions, according to aspects of the disclosure. In some examples, the instruction flow 250 may be implemented by a GPU, such as GPU 48 shown in FIG. 2. Accordingly, for purposes of illustration only, the instruction flow 250 is described as being implemented by the example GPU 48 shown in FIG. 2. FIG. 7 shows instruction culling on both a workgroup and work item basis. It should be understood, however, that a GPU, such as GPU 48, may perform instruction culling on only a workgroup basis, or only a work item basis.

According to aspects of the disclosure, GPU 48 receives instructions and organizes the instructions into one or more workgroups (254). In some examples, GPU 48 may organize the instructions into one or more grids of workgroups, such as the grids of workgroups shown in FIG. 4. After the instructions have been organized into workgroups, GPU 48 performs workgroup culling (258). For example, GPU 48 may perform workgroup culling by analyzing values stored in cull buffer 76 and relating the values to the current set of workgroups. GPU 48 may cull any workgroups that GPU 48 identifies as being comprised entirely of irrelevant instructions. After culling workgroups, GPU 48 may set up the workgroups for execution (262). For example, GPU 48 may reorganize remaining workgroups into a configuration that allows the workgroups to be distributed to SPs 84.

In some examples, GPU 48 then performs work item culling (266). GPU 48 may perform work item culling on a per-workgroup basis. For example, GPU 48 may analyze values stored in cull buffer 76 and relate the values to work items of a workgroup one workgroup at a time. GPU 48 may cull any work items that GPU identifies as irrelevant (e.g., according to cull buffer values). After culling work items, GPU 48 may set up work items for execution (270). For example, GPU 48 may reorganize remaining work items into a configuration that allows the workgroups to be built into threads and executed by SPs 84.

Next, GPU 48 may execute the one or more workgroups and associated work items (274). After executing the instructions, GPU 48 may update values for culling subsequent workgroups and work items (278). For example, GPU 48 may update cull buffer 76 with values that represent a characteristic of the result of the executed instructions.

Techniques of this disclosure generally include executing an application for processing input data using more than one kernel. Upon executing work items and workgroups of a first kernel, a GPU may set cull buffer values that represent whether the work items and workgroups of a second kernel are relevant. That is, the GPU may set cull buffer values based on the results of the first kernel, which represent whether respective work items and workgroups of a second kernel that are associated with the same input data of each of the work items and workgroups of the first kernel are relevant. Thus, after executing the first kernel, GPU 48 may utilize the cull buffer values to cull irrelevant work items and workgroups in the second kernel so that the irrelevant work items and workgroups are not executed.

Thus, aspects of the disclosure generally relate to instruction culling. It should be understood that the examples and aspects described with respect to the figures above are provided as examples only. Aspects of the disclosure also relate to other manners of performing instruction culling. For example, while instruction culling is described as being wholly carried out by GPU, in another example, instruction may be carried out by a combination of computing components or devices. In one example, a cull module and cull buffer, such as the cull module 80 and cull buffer 76 shown in FIG. 2, may be implemented in a component that is external to a GPU. In this example, central processing unit or host processor may access the cull buffer and implement instruction culling prior to providing the instructions to the GPU.

In addition, it should be understood that aspects of the disclosure relate generally to culling irrelevant work items and workgroups before they are executed. As described above, the term "work item" generally describes one or more instruction that defines a function for processing input data, which may include one or more individual instructions. A "work item" may also be referred to in some architectures as a "thread." Moreover, it should be understood that the term "workgroup" refers generically to a predefined group of work items. A "workgroup" may also be referred to in some architectures as a "thread block."

In one or more examples, the functions described may be implemented in hardware, software executed on hardware, firmware executed on hardware, or any combination thereof. In some examples, instructions stored on a computer-readable media may cause the hardware components to perform their respective functions described above. The computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Combinations of the above should also be included within the scope of computer-readable media.

The code may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined by a collection of interoperative hardware units, including one or more processors as described above, in conjunction with suitable software and/or firmware.

Various examples and aspects of the disclosure have been described. These and other examples and aspects are within the scope of the following claims.

The invention claimed is:

1. A method of processing data with a graphics processing unit (GPU), the method comprising:
executing, with one or more shader processors of the GPU, a first work item of a first kernel of an application that includes the first kernel and one or more consecutively executed second kernels, wherein the first work item includes one or more instructions for processing input data;
generating, in addition to a result of the first work item, a plurality of cull values based on the result of the first work item of the first kernel, wherein the plurality of cull values indicate whether to execute work items of the one or more second kernels on the input data; and
when the plurality of cull values indicate that the work items of the one or more second kernels are not to be executed, determining not to execute the work items of the one or more second kernels and removing the work items of the one or more second kernels from the instruction stream prior to scheduling the work items to be executed by the one or more shader processors.

2. The method of claim 1, further comprising storing the plurality of cull values in a buffer, and wherein determining whether to execute the work items of the one or more second kernels comprises reading the plurality of cull values stored in the buffer.

3. The method of claim 2, further comprising:
executing a second work item of a second kernel of the one or more second kernels with the shader processor of the GPU on the input data;
updating the plurality of cull values based on a result of the second work item, wherein the updated plurality of cull values indicate whether to execute subsequent work items of the one or more second kernels on the input data;
and determining whether to execute the subsequent work items based on the updated plurality of cull values.

4. The method of claim 1, further comprising:
executing a first workgroup with the shader processor of the GPU, wherein the first workgroup is associated with the first kernel and wherein the first workgroup comprises a plurality of instructions including the first work item for processing the input data;
generating one or more workgroup cull values based on results of the first workgroup, wherein the one or more workgroup cull values indicate whether to execute workgroups of the one or more second kernels; and
determining whether to execute the workgroups of the one or more second kernels based on the one or more workgroup cull values.

5. The method of claim 1, wherein the one or more second kernels comprises a plurality of kernels, and wherein generating the plurality of cull values comprises generating one or more cull values that indicate whether to execute all of the work items of the plurality of kernels on the input data.

6. The method of claim 1, wherein each respective cull value of the plurality represents a respective characteristic of a result of the first work item.

7. An apparatus for processing data with a graphics processing unit (GPU), the apparatus comprising:
one or more shader processors configured to:
execute a first work item of the first kernel of an application that includes the first kernel and one or more consecutively executed second kernels that includes one or more instructions for processing input data, and
generate, in addition to a result of the first work item, a plurality of cull values based on the result of the first work item of the first kernel, wherein the plurality of cull values indicate whether to execute work items of the one or more second kernels on the input; and
a cull module configured to, when the plurality of cull values indicate that the work items of the one or more second kernels are not to be executed, determine not to execute the work items of the one or more second kernels and remove the work items of the one or more second kernels from the instruction stream prior to scheduling the work items to be executed by the one or more shader processors.

8. The apparatus of claim 7, further comprising a cull buffer configured to store the plurality of cull values, and wherein the cull module is configured to determine whether to execute the work items of the one or more second kernels by reading the plurality of cull values stored in the cull buffer.

9. The apparatus of claim 8, wherein the one or more shader processors are further configured to:
execute a second work item of a second kernel of the one or more second kernels,
update the plurality of cull values based on a result of the second work item, wherein the updated plurality of cull values indicate whether to execute subsequent work items of the one or more second kernels on the input data
determine whether to execute the subsequent work items based on the updated plurality of cull values.

10. The apparatus of claim 7, wherein the one or more shader processors are configured to:
execute a first workgroup that is associated with the first kernel, wherein the first workgroup comprises a plurality of instructions including the first work item for processing the input data,
generate one or workgroup cull values based on results of the first workgroup, wherein the one or more workgroup cull values indicate whether to execute workgroups of the one or more second kernels, and
determine whether to execute the workgroups of the one or more second kernels based on the one or more workgroup cull values.

11. The apparatus of claim 7, wherein the one or more shader processors and cull module are included in portable computing device.

12. The apparatus of claim 7, wherein the one or more second kernels comprises a plurality of kernels, and wherein to generate the plurality of cull values, one or more shader processors are configured to generate one or more cull values that indicate whether to execute all of the work items of the plurality of kernels on the input data.

13. The apparatus of claim 7, wherein each respective cull value of the plurality represents a respective characteristic of a result of the first work item.

14. A non-transitory computer-readable storage medium encoded with instructions for causing one or more processors of a computing device to:
execute, with one or more shader processors of a GPU of the computing device, a first work item of a first kernel of an application that includes the first kernel and one or more consecutively executed second kernels, wherein the first work item includes one or more instructions for processing input data;

generate, in addition to a result of the first work item, a plurality of cull values based on the result of the first work item of the first kernel, wherein the plurality of cull values indicate whether to execute work items of the one or more second kernels on the input data; and when the plurality of cull values indicate that the work items of the one or more second kernels are not to be executed, determine not to execute the work items of the one or more second kernels and remove the work items of the one or more second kernels from the instruction stream prior to scheduling the work items to be executed by the one or more shader processors.

15. The non-transitory computer-readable storage medium of claim 14, further comprising instructions for causing the one or more processors of the computing device to store the plurality of cull values to a buffer, and wherein to determine whether to execute the work items of the one or more second kernels the instructions cause the one or more processors to read the plurality of cull values stored in the cull buffer.

16. The non-transitory computer-readable storage medium of claim 15, further comprising instructions for causing the one or more processors of the computing device to:

execute a second work item of a second kernel of the one or more second kernels with the shader processor of the GPU on the input data;

update the plurality of cull values based on a result of the second work item, wherein the updated plurality of cull values indicate whether to execute subsequent work items of the one or more second kernels on the input data;

and determine whether to execute the subsequent work items based on the updated plurality of values.

17. The non-transitory computer-readable storage medium of claim 14, further comprising instructions for causing the one or more processors of the computing device to:

execute a first workgroup with the shader processor of the GPU, wherein the first workgroup is associated with the first kernel and wherein the first workgroup comprises a plurality of instructions including the first work item for processing the input data;

generate one or more workgroup cull values based on results of the first workgroup, wherein the one or more workgroup cull values indicate whether to execute workgroups of the one or more second kernels; and determine whether to execute the workgroups of the one or more second kernels based on the one or more workgroup cull values.

18. The non-transitory computer-readable storage medium of claim 14, wherein the one or more second kernels comprises a plurality of kernels, and wherein to generate the plurality of cull values, the instructions cause the one or more processors to generate one or more cull values that indicate whether to execute all of the work items of the plurality of kernels on the input data.

19. The non-transitory computer-readable storage medium of claim 14, wherein each respective cull value of the plurality represents a respective characteristic of a result of the first work item.

20. An apparatus for processing data with a graphics processing unit (GPU), the apparatus comprising:

a means for executing, with one or more shader processors of the GPU, a first work item of a first kernel of an application that includes the first kernel and one or more consecutively executed second kernels, wherein the first work item includes one or more instructions for processing input data;

a means for generating, in addition to a result of the first work item, a plurality of cull values based on the result of the first work item of the first kernel, wherein the plurality of cull values indicate whether to execute work items of the one or more second kernels on the input data; and a means for determining, when the plurality of cull values indicate that the work items of the one or more second kernels are not to be executed, not to execute the work items of the one or more second kernels and removing the work items of the one or more second kernels from the instruction stream prior to scheduling the work items to be executed by the one or more shader processors.

21. The apparatus of claim 20, further comprising a means for storing the plurality of cull values in a buffer, and wherein the means for determining whether to execute the work items of the one or more second kernels comprises means for reading the plurality of cull values stored in the buffer.

22. The apparatus of claim 21, further comprising:

a means for executing a second work item of a second kernel of the one or more second kernels with the shader processor of the GPU on the input data;

a means for updating the plurality of cull values based on a result of the second work item, wherein the updated plurality of cull values indicate whether to execute subsequent work items of the one or more second kernels on the input data;

and a means for determining whether to execute the subsequent work items based on the updated plurality of cull values.

23. The apparatus of claim 20, further comprising:

a means for executing a first workgroup with the shader processor of the GPU, wherein the first workgroup is associated with the first kernel and wherein the first workgroup comprises a plurality of instructions including the first work item for processing the input data;

a means for generating one or more workgroup cull values based on results of the first workgroup, wherein the one or more workgroup cull values indicate whether to execute workgroups of the one or more second kernels; and a means for determining whether to execute the workgroups of the one or more second kernels based on the one or more workgroup cull values.

24. The apparatus of claim 20, wherein the one or more second kernels comprises a plurality of kernels, and wherein the means for generating the plurality of cull values comprises means for generating one or more cull values that indicate whether to execute all of the work items of the plurality of kernels on the input data.

25. The apparatus of claim 20, wherein each respective cull value of the plurality represents a respective characteristic of a result of the first work item.

* * * * *